United States Patent [19]
Haefner et al.

[11] Patent Number: 5,138,211
[45] Date of Patent: Aug. 11, 1992

[54] SPHERICAL CAM CLUTCH FOR SERVOACTUATOR

[75] Inventors: Donald Haefner, Oak Park; David Preston, Clarkston, both of Mich.

[73] Assignee: Eaton Corporation, Cleveland, Ohio

[21] Appl. No.: 736,536

[22] Filed: Jul. 26, 1991

[51] Int. Cl.⁵ .................... H02K 7/108; F16D 43/00
[52] U.S. Cl. ........................... 310/78; 192/93 C
[58] Field of Search ............. 192/93 C, 93 R; 310/78

[56] References Cited
U.S. PATENT DOCUMENTS

| | | | |
|---|---|---|---|
| 2,474,789 | 6/1949 | Perhacs | 192/93 C |
| 3,572,163 | 3/1971 | Clark | 192/93 C |

FOREIGN PATENT DOCUMENTS 571147 12/1957 Italy ........................... 192/93 C Primary Examiner—Steven L. Stephan
Assistant Examiner—D. L. Rebsch
Attorney, Agent, or Firm—R. A. Johnston

[57] ABSTRACT

A servo-actuator has a motor driven input pinion engaging a driven gear clutched to an output pinion. The driven gear has an internally notched hub and the output pinion has a central core with a tapered pin slidable therein. Spherical cams are slidably received in a cross hole and are moved outward to lock the output pinions to the hub when a solenoid is energized, to move the tapered pin into contact with the cam members. The angle of the notch and the pin taper are chosen to effect a positive de-energization force on the pin for facilitating disengagement.

4 Claims, 4 Drawing Sheets

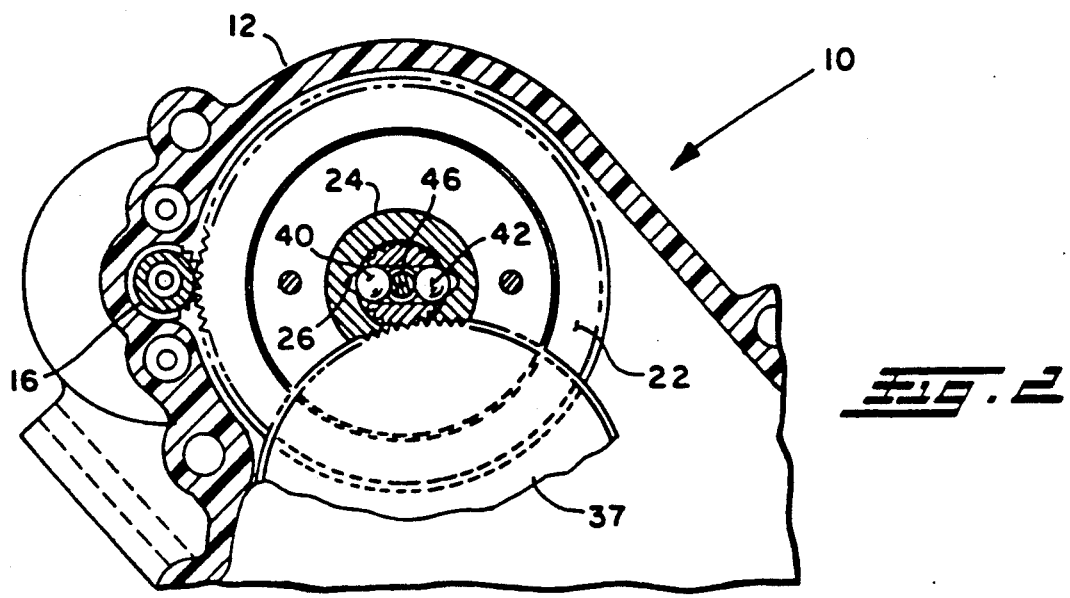
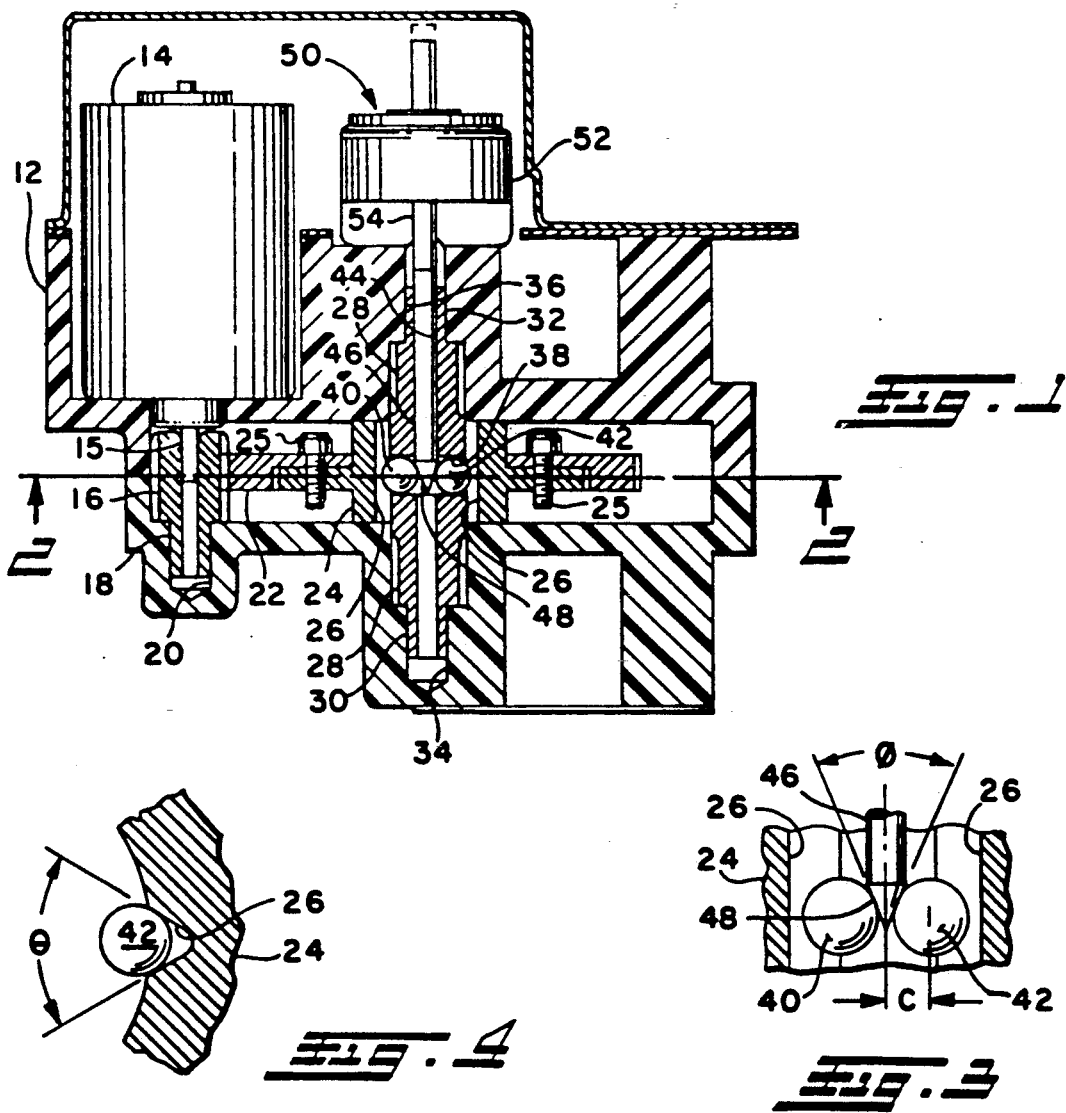

SPHERICAL CAM CLUTCH FOR SERVOACTUATOR

BACKGROUND OF THE INVENTION

The present invention relates to motorized servo-actuators and particularly servo-actuators employing a small subfractional horsepower electric motor driving a speed reducer or gear train for providing a mechanical movement or force output for performing a desired load function. Electric servo-actuators of this type find application in engine-driven vehicles where it is desired to provide electrical control of the vehicle engine throttle. Such electrical engine throttle control is desirable for vehicles equipped with an automatic cruise control function or a traction control mode of operation for the power train. In the vehicle cruise control function, the throttle position is electrically regulated about a desired set speed to provide substantially constant vehicle speed. In the traction control mode of operation, the vehicle throttle is modulated to prevent loss of wheel traction despite mechanical movement of the accelerator pedal by the vehicle operator. The servo-actuator thus intervenes in the throttle control to maintain excess driving force to the wheel in a manner not to cause loss of traction.

Where electric engine throttle actuators have been employed for cruise control and traction control modes of operation, it has been desired to provide for instantaneous and disablement of the electric throttle actuator for providing emergency throttle release in the event of a malfunction in the control of the servo motor. Typically, the electrical servo-actuator is connected to the throttle shaft by means of an electrically operated clutching mechanism to permit total mechanical disengagement of the electric servo-actuator from the vehicle throttle. In the event of mechanical malfunction upon electrical de-energization of the clutching mechanism, it has been desired to provide for positive force disengagement of the clutching mechanism.

SUMMARY OF THE INVENTION

The present invention provides a motorized servo-actuator employing a relatively high shaft speed motor driving a pinion gear which engages a driven gear which in turn is clutched to drive a second pinion adapted for driving an output load gear. The clutching mechanism employs a recess provided in the hub of the driven gear with at least one cam member slidably received in a cross hole in the pinion which is received through the hub of the driven gear. The pinion also has a longitudinal central bore with a tapered pin slidably received therein which is moved upon energization of the clutch solenoid to move the cam members outwardly to engage the notch in the hub for providing driving engagement between the driven gear hub and the output pinion. Upon de-energization of the clutch solenoid, the forces of driving engagement between the notch and the cam member exert a longitudinal force on the pin to drive the pin away, to cause the cam members to disengage from the notch and disable the clutch.

Although the clutching mechanism is described with respect to an electric motor driving a reduction gear, the clutching mechanism may be employed between any two concentric power transmission shafts.

BRIEF DESCRIPTION OF THE DRAWINGS

FIG. 1 is a top view of the servo-actuator employing the clutch of the present invention;

FIG. 2 is a section view taken along section-indicating lines 2—2 of FIG. 1;

FIG. 3 is an enlarged view of a portion of FIG. 2;

FIG. 4 is an enlarged view of a portion of FIG. 1;

DETAILED DESCRIPTION

Figure 5:
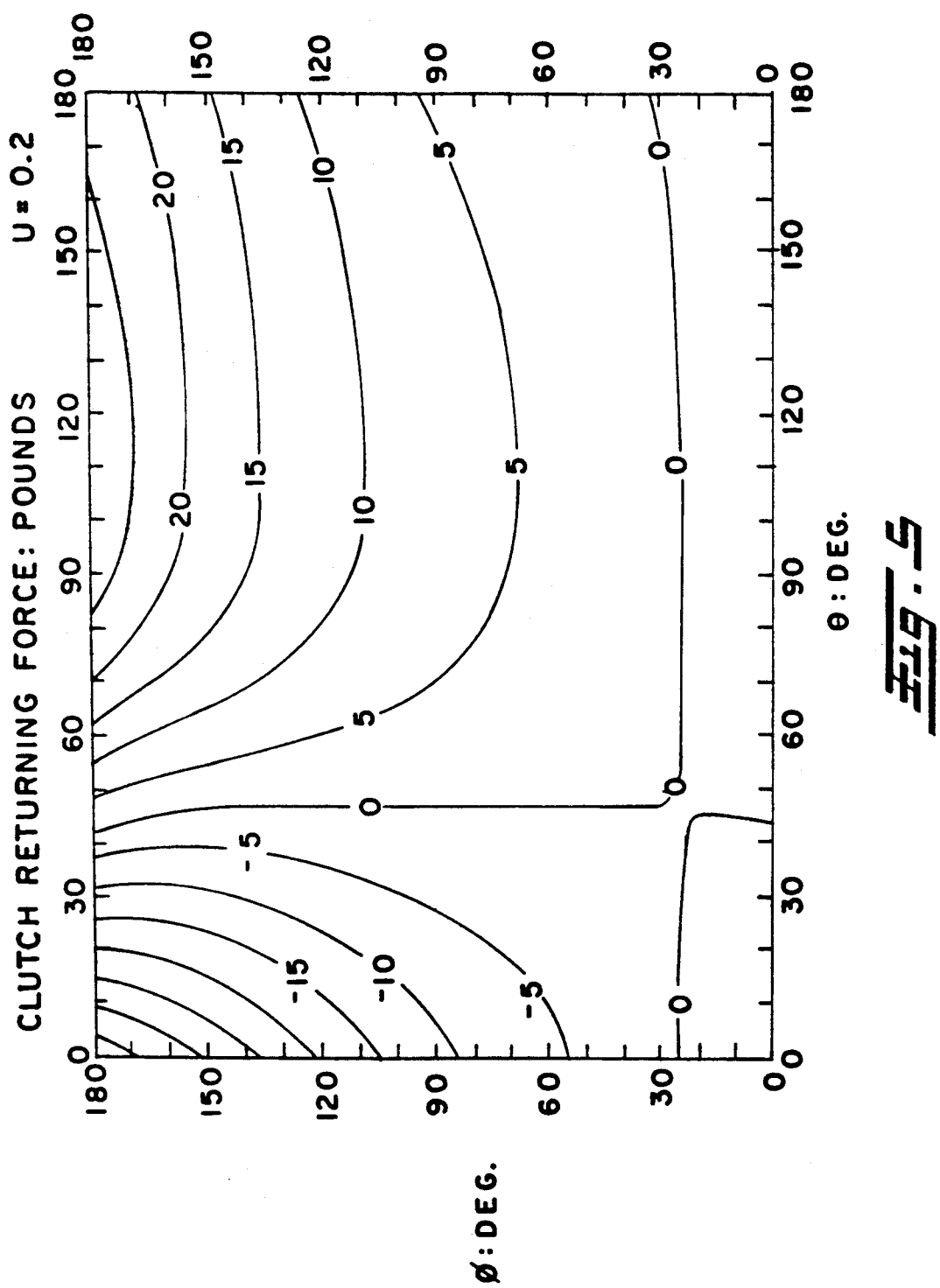
FIG. 5 is a plot of pin-included angle versus notch angle for a coefficient of friction of 0.2.

Referring to FIG. 1, the servo-actuator assembly is indicated generally and has a housing 12 in which is mounted a motive means. Typically in an automotive throttle actuator application of the present invention the motive means comprises a small subfractional horsepower high-shaft RPM direct current motor. The motor 14 has connected to its output shaft an input or motor pinion gear 16 which has the end portion thereof reduced in diameter as denoted by reference numeral 18 and journalled for rotation in bore 20 provided in the housing.

Motor pinion 16 engages the peripheral teeth on a driven gear 22 of substantially larger diameter, thereby providing a speed reduction and torque multiplication, which in the presently preferred practice is at least a 10-1 ratio reduction. Gear 22 is attached to annular hub 24.

Referring to FIGS. 1 through 4, the hub 24 has at least one, and preferably 2, notches 26 formed therein which extend longitudinally of the hub and have a generally V-shaped configuration with the sides thereof subtending an including angle denoted by the reference character $\theta$ in FIG. 4.

An output pinion gear 28 is disposed through the center of hub 26 and has the opposite ends thereof formed to a reduced diameter indicated by the reference numeral 30,32; and, the reduced diameter portions 30,32 are journalled for rotation in, respectively, bores 34,36 provided in the housing 12 for positioning the output pinion 28. It will be understood that the pinion 28 has in the presently preferred practice teeth provided on each of the opposite ends thereof to enable driving engagement therewith; as, for example, by an output driven member indicated by reference numeral 37 in FIG. 2, which is typically a driven gear meshing with the pinion 28. Gear 37 may perform any desired load function, such as rotate a cam disc or track.

The pinion 28 has a cross hole 38 formed therethrough at the midlength thereof with at least one, and preferably a plurality, of cam members slidably received therein. In the presently preferred practice, the cam members comprise spherical members 40,42 which are guided in closely fitting arrangement for free sliding movement in the cross hole 38.

The output pinion member 28 has a central longitudinal bore 44 provided therein which has slidably received therein in closely fitting arrangement a plunger or pin 46 having a tapered end 48 which engages the spherical members 40,42 upon downward movement of the pin 46 with respect to FIG. 1 and which engagement is shown in greater detail in FIG. 3.

A plunger actuator indicated generally at 50, preferably comprises a solenoid 52 having an armature 54 which contacts the end of plunger 46 upon energization of the solenoid for effecting downward movement of the plunger 46. In the presently preferred practice, the spherical cam members 40,42 are sized such that the members 40,42 are drivingly engaged with the notches 26 when the distance denoted by the reference character C FIG. 3 is in the range of 0.18 to 0.22 inches (4.57 to 5.59 millimeters).

An important feature of the invention is the axial clutch returning force applied to the plunger 46 by the driving torque between gear hub 24 and pinion 28. The torque is applied through the sides of the notches 26 to the spherical cam members 40,42 and transmitted from the spherical members by cam action to the tapered surface 48 on the plunger 46. The particular value of the axial clutch returning force will be determined by the coefficient of friction between the materials and the angle $\theta$ of the notch and the included angle $\phi$ of the tapered surface 48 on the plunger 46.

Figure 6:
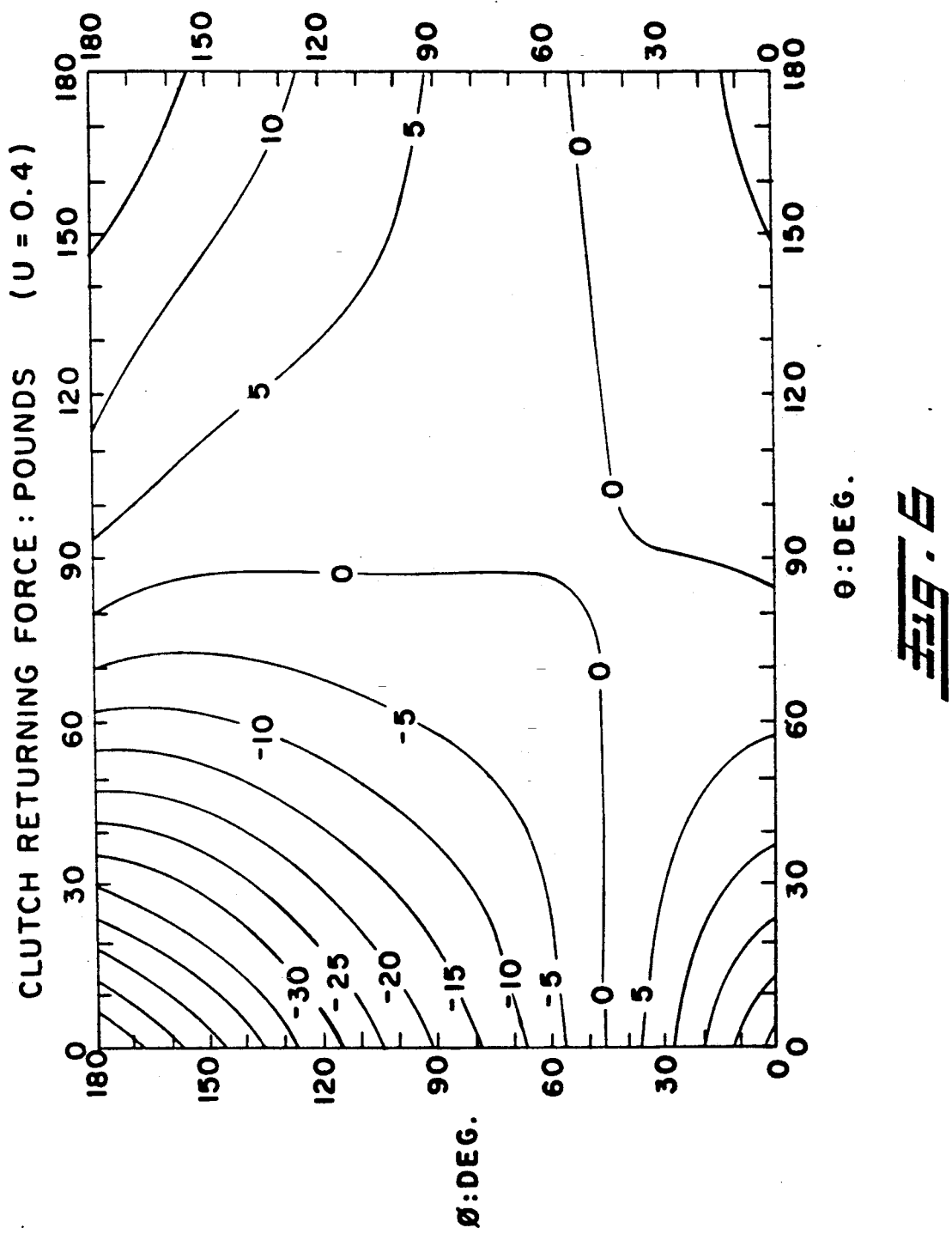
FIG. 6 is a plot similar to FIG. 5 for a coefficient of friction of 0.4.
Figure 7:
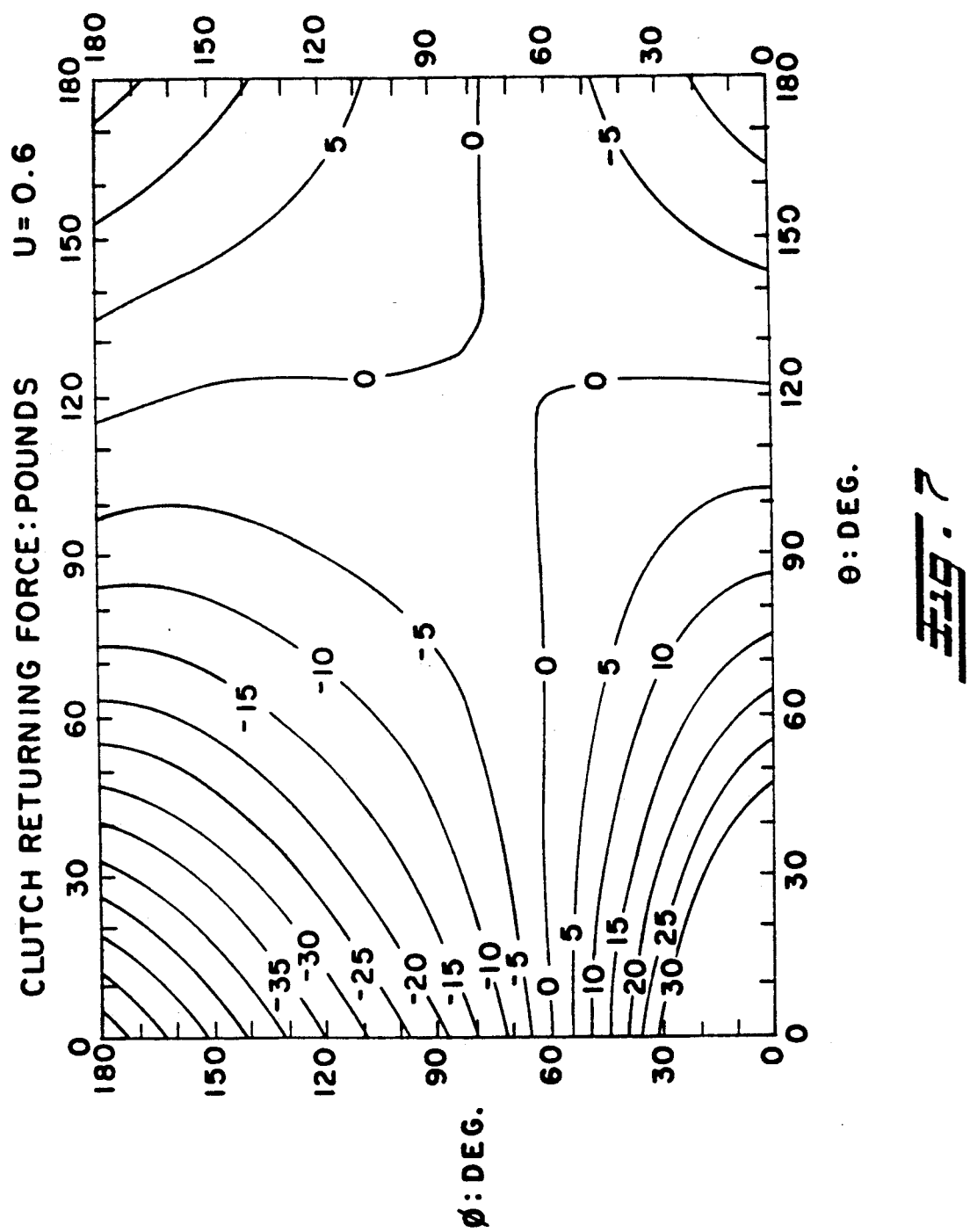
FIG. 7 is a plot similar to FIG. 5 for a coefficient of friction of 0.6.

Referring to FIGS. 5, 6, and 7, plots of the clutch returning force in pounds are shown for a subfractional horsepower electric motor driving a speed reducer providing 20 in.-lbs. (2.3 n.m.) transmitted torque at its output as a family of curves for a range of values of the included angle $\phi$ of the tapered surface 48 and the included angle $\theta$ of the sides of the notches 26. A coefficient of friction of 0.2 is assumed for the plot of FIG. 5, a coefficient of friction of 0.4 for the plot of FIG. 6, and a coefficient of friction of 0.6 for the plot of FIG. 7.

Referring to FIG. 5 specifically, assuming an included angle $\phi$ of 120° for the tapered surface 48 and an angle $\theta$ of 90° for the sides of the notches 26, it will be seen from FIG. 5 that the clutch returning force is approximately a +11 pounds. Whereas, for the increased coefficient of friction having a value 0.4, from FIG. 6, for the same values of $\phi=120°$ and $\theta=90°$, it will be seen that the clutch returning force is on the order of 1 pound.

Referring to FIG. 7, for a large coefficient of friction of 0.6 and for values of $\phi=120°$ and $\theta=90°$, it will be seen that the clutch returning force is on the order of $-5$ pounds. It will be understood from FIGS. 5, 6, and 7 that the coefficient of friction has a significant influence on the clutch returning force and may require changes in the angles of the plunger tapered surface 48 and the angle of the sides of the notches 26.

It will be understood that when the solenoid coil 52 is de-energized, and with the proper choices of notch angle $\theta$ and plunger taper angle $\theta$ from FIGS. 5, 6, and 7, the plunger pin 46 will be moved upwardly by the torque from gear hub 24 by virtue of the spherical surface of the cam members acting against the sides of the notches 26 and the tapered end of pin 46. As the plunger 26 moves upwardly, members 40,42 move radially inwardly in the cross hole 38 so that the spherical cam members do not protrude radially beyond the outer periphery of the pinion 28 thereby disengaging them from the notches 26 thereby, permitting rotational slippage between gear hub 24 and the output pinion 28.

The present invention thus provides a unique clutching mechanism for a servo-actuator having a driven gear supplied with power from a motive means with the driven gear having a hub notched to receive therein a pair of spherical cam members. The spherical cam members are urged outwardly in a cross hole provided in an output pinion which is received through the gear hub. The spherical cam members are urged outwardly by axial engagement by a tapered pin which causes the spherical cam members to engage the notch in the gear hub for transmitting power between the gear hub and the output pinion. The tapered pin is moved axially to engage the spherical members by energization of a solenoid. Upon de-energization of the solenoid, the torque transmitted between by the inclined sides of notches in the gear hub acting on the spherical cam members moves the cam members inwardly, effecting an axial force on the tapered pin and provides a positive axial return force on the pin and solenoid armature to effect positive disengagement of the clutch. The angle of the notches in the gear hub in the included angle of taper on the plunger are chosen, for a given coefficient of friction between the materials to provide the desired clutch return force. Emperical plots of the clutch return force for various angles of the notch sides and the taper on the plunger enable the proper configuration of the clutch members for a given coefficient of friction.

Although the invention has hereinabove been described with respect to the illustrated embodiments, it will be understood that the invention is capable of modification and variation, and is limited only by the scope of the following claims.

We claim:

1. An electrically operated servo-actuator assembly comprising:
   (a) housing means;
   (b) motive power means mounted on said housing means and having a drive member on the shaft thereof;
   (c) annular driven means journalled for rotation on said housing means, said driven means having at least one notch means formed on the inner periphery thereof and operatively driven by said drive member;
   (d) an output member disposed centrally with respect to said driven means and having a cross hole therein, said output member having an axial hole therein;
   (e) at least one cam member slidably disposed in said cross hole and movable between a first position engaging said notch means for preventing relative rotation between said gear means and said output member and a second position permitting such relative rotation;
   (f) plunger means slidably disposed in said axial hole and movable therein between a first and second position, wherein said plunger means defines cam surfaces operable in said first position to effect movement of said cam member to said first position and said plunger means is operable in said second position to permit said cam member to move to said second position; and,
   (g) actuator means operable upon electrical energization to move said plunger means between said first and second position, wherein said notch means and cam surfaces are configured such that upon de-energization of said actuator means, said plunger means is returned to said first position by the forces of said notch means acting through said cam member on said cam surface.

2. The servoactuator defined in claim 4, wherein said notch has a tapered configuration in transverse section.

3. The servoactuator defined in claim 1, wherein said notch has a tapered configuration in transverse section.

4. A clutchable servo-actuator comprising:

(a) housing means including motor means operable to provide, upon receipt of a control signal, rotation of an input shaft;

(b) speed reducer means operatively connected to said input shaft and including an output member having a hub with an output shaft means received therein;

(c) clutching means operative to engage and disengage power transmission between said hub and said output shaft, said clutch means including at least one notch formed on the inner periphery of said hub and a cross bore formed in said output shaft with a clutching member movably received in said cross bore, said output shaft having a longitudinally extending bore formed therein with pin means slidably received therein, said pin means defining cam surfaces operable upon movement of said pin means in one direction to move said clutching member outwardly to engage said notch to effect rotary driving engagement between said hub and said output shaft, and upon movement of said pin means in a second direction, said cam means is operative to effect inward movement of said clutching means to effect disengagement of said clutching means with said notch thereby permitting relative rotation of said hub with respect to said output shaft, said cam surfaces and said notch configured such that said pin means is urged in said second direction by the forces of said notch acting against said clutching member and transmitted therethrough to said pin means cam surfaces.

* * * * *